United States Patent [19]

Freed et al.

[11] 3,853,879

[45] Dec. 10, 1974

[54] TETRAHYDROPYR-AZINOINDOLE-2-CARBOXAMIDES

[76] Inventors: Meier E. Freed; Elisabeth Hertz Freed, both of 137 Hollow Rd., Paoli, Pa. 19301

[22] Filed: Feb. 7, 1973

[21] Appl. No.: 330,349

Related U.S. Application Data

[63] Continuation-in-part of Ser. No. 130,523, April 1, 1971, Pat. No. 3,736,324, which is a continuation-in-part of Ser. No. 769,388, Oct. 21, 1968, Pat. No. 3,641,030.

[52] U.S. Cl. 260/268 TR, 260/247.2 A, 260/243 B, 424/250
[51] Int. Cl. ............................................. C07d 51/70
[58] Field of Search ................ 260/268 TR, 268 PH

[56] References Cited

UNITED STATES PATENTS

| | | | |
|---|---|---|---|
| 3,317,524 | 2/1967 | Freed | 260/268 TR |
| 3,542,780 | 11/1970 | Freed et al. | 260/268 TR |
| 3,641,030 | 2/1972 | Freed et al. | 260/268 TR |

*Primary Examiner*—Donald G. Daus
*Assistant Examiner*—Jose Tovar
*Attorney, Agent, or Firm*—Joseph Martin Weigman

[57] ABSTRACT

This invention concerns tetrahydropyrazinoindole-2-carboxamides and dihydrodiazepinoindole-2-carboxamides which are pharmacologically active as central nervous depressants.

4 Claims, No Drawings

TETRAHYDROPYR-AZINOINDOLE-2-CARBOXAMIDES

This application is a continuation-in-part of application Ser. No. 130,523 filed Apr. 1, 1971 which issued as U.S. Pat. No. 3,736,324 on May 29, 1973 which was in turn a continuation-in-part of application Ser. No. 769,388 filed Oct. 21, 1968 which issued as U.S. Pat. No. 3,641,030 on Feb. 8, 1972.

This invention relates to new and novel carboxamides. In particular, it is concerned with tetrahydropyrazinoindole-2-carboxamides and dihydrodiazepinoindole-2-carboxamides which in standard and accepted pharmacological tests demonstrate central nervous system activity which is useful in producing a calming effect in mammals.

The new and novel compounds within the scope of the present invention are depicted by the following structural formula:

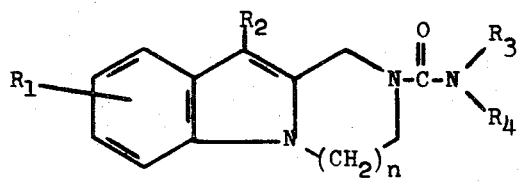

wherein $R_1$ is selected from the group consisting of hydrogen, halogen, lower alkyl, lower alkoxy and benzyloxy; $R_2$ is selected from the group consisting of hydrogen and lower alkyl; $R_3$ and $R_4$ when taken separately are selected from the group consisting of hydrogen, lower alkyl, phenyl, di(lower)alkylamino (lower)alkyl, morpholinyl(lower)alkyl, piperidyl(lower)alkyl, lower alkylpiperazinyl(lower)alkyl and pyrrolidinyl(lower)alkyl with the proviso that $R_3$ is hydrogen when $R_4$ is other than hydrogen and lower alkyl; $R_3$ and $R_4$ when taken together with the nitrogen atom to which they are attached form a ring selected from the group consisting of piperidyl, phenylpiperazinyl, lower alkylpiperazinyl, morpholinyl, thiomorpholinyl, pyrrolidinyl and imidazolidinyl; and $n$ is an integer from 1 to 2. As employed herein the terms "lower alkyl", "lower alkoxy" and the like are meant to include both branched and straight chain hydrocarbon moieties having from one to about seven carbon atoms. Typical examples of the compounds of this invention are: N-(2-dimethylaminoethyl)-1,2,3,4-tetrahydropyrazino[1,2-a]indole-2-carboxamide; N-(3-dimethylaminopropyl)-1,2,3,4-tetrahydropyrazino[1,2-a]indole-2-carboxamide; 1,2,3,4-tetrahydro-2-(4-phenylpiperazinylcarbonyl)pyrazino[1,2-a]indole; 4,5-dihydro-N-(1-methyl-4-piperidyl)-1H[1,4]-diazepino[1,2-a] indole-2-(3H)-carboxamide; 4,5-dihydro-N-(2-morpholinoethyl)-1H[1,4]-diazepino[1,2-a]indole-2-(3H)-carboxamide; and 4,5-dihydro-N-(1-phenyl-4-piperazinylcarbonyl)-1H[1,4]-diazepino [1,2-a]indole.

The new and novel compounds of the present invention may be prepared by the process which is hereinafter schematically depicted.

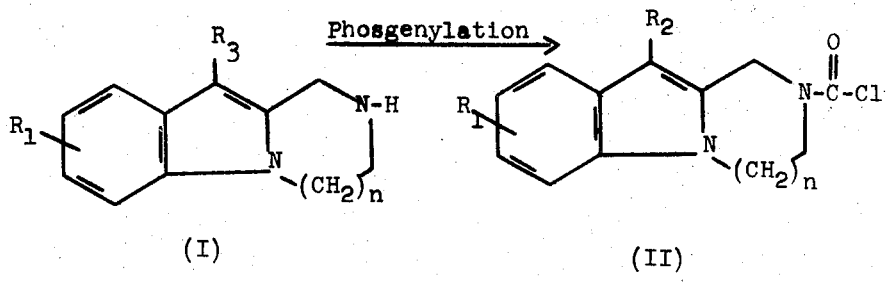

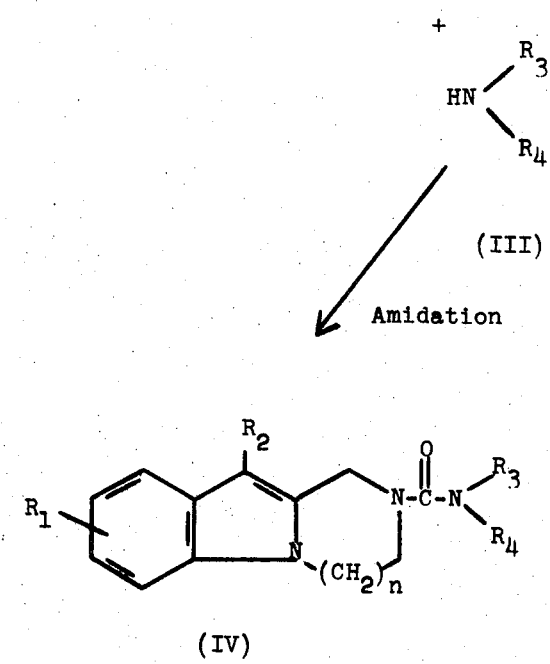

wherein $R_1$, $R_2$, $R_3$, $R_4$ and the integer n are defined as above. The phosgenylation reaction is effected by contacting, at a temperature below 7°C., a solution of phosgene in a reactioninert, anhydrous solvent with a solution containing an indole (I) and a proton acceptor in a reaction-inert anhydrous solvent. Thereafter, the resulting mixture is stirred at a temperature below 7°C. for a period of about one to about 4 hours. Preferably this reaction is conducted by admixing a solution phosgene in ether with an indole (I) and triethylamine in dichloromethane.

When the phosgenylation is complete, the resulting carbonyl chloride (II) is separated by standard recovery procedures e.g. the reaction mixture is filtered and the filtrate evaporated to dryness to afford the carbonyl chloride (II) as a residue.

The amidation reaction is effected by contacting the above-prepared carbonyl chloride (II) with an appropriate amine (III), in the presence of a proton acceptor in a ketonic solvent at about the reflux temperature of the reaction mixture for a period of about ten to about thirty hours. Preferably this reaction is conducted in the presence of triethylamine in 2-butanone.

When the amidation is complete, the resulting product (IV), either a tetrahydropyrazinoindole-2-carboxamide (IV, $n = 1$) or a dihydrodiazepinoindole-2-carboxamide (IV, $n = 2$), is recovered by conventional techniques e.g. the reaction mixture is evaporated to dryness and the residue recrystallized from a suitable solvent, such as, acetonitrile, ethanol, dichloromethaneheptane mixtures and the like.

The indoles (I) employed as starting materials in the above process are prepared by the procedure described in copending U.S. Pat. application, Ser. No. 769,387 filed Oct. 21, 1968 entitled "Process For The Preparation of Tetrahydropyrazinoindoles and Related Compounds" by Meier E. Freed and Elisabeth Hertz. Therein these indoles (I) are prepared by the hydrogenation of an appropriate alkyl 1-cyanoalkylindole-2-carboxylate using a platinum dioxide catalyst to afford the corresponding alkyl 1-aminoalkylindole-2-carboxylate salt which is neutralized to produce either a 1,2,3,4-tetrahydropyrazino[1,2-a]indole-1-one or a 2,3,4,5-tetrahydro-1H[1,4]-diazezino[1,2-a]indol-1-one which is then reduced with a reducing agent, such as, lithium aluminum hydride to yield an appropriate 1,2,3,4-tetrahydropyrazino[1,2-a]indole or a 2,3,4,-,5-tetrahydro-1H[1,4]-diazepino[2,1-a]indole. The amines (III) which are employed as starting materials are either commercially available or are readily prepared by procedures well known in the art.

As employed herein the term "reaction-inert, anhydrous solvent" is meant to include any organic liquid which is substantially free of water and will dissolve the reactants without interfering with their interaction. Many such solvents will readily suggest themselves to ones skilled in the chemical arts, for example, ether, dichloromethane, diisopropyl ether, dioxan, benzene, tetrahydrofuran, toluene, xylene, hexane and the like. The term "proton acceptor" defines a substance that is capable of taking up protons from solution, such as, triethylamine, trimethylamine, pyridine, etc. The time and temperature ranges employed in the above process are not critical and simply represent the most convenient ranges consistent with carrying out the reactions in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The above-prepared compounds (IV) which contain more than one nitrogen atom in the $R_3$ or $R_4$ substituents when taken either separately or together are basic in nature. Therefore, advantage may then be taken of the water solubility of salts of these compounds formed with acids in the isolation and/or purification thereof and in the preparation of aqueous solutions thereof for oral or parenteral administration. Of course, only salts formed with pharmacologically-acceptable acids should be employed in biological applications. Particularly effective salts are those formed with pharmacologically-acceptable acids having a pK value of 3 or lower. Such acids are well known in the art, for example, hydrochloric, hydrobromic, sulfuric, nitric, phosphoric, fumaric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The new and novel compounds (IV) of the present invention possess valuable biological properties. In particular, these compounds (IV) in standard pharmacological procedures demonstrate nervous system activity and are useful as depressants. Because of this property they have utility in producing a calming effect in mammals.

In the pharmacological evaluation of the central nervous system depressant compounds of this invention the in vivo effects of the compounds of this invention are tested as follows:

The compound is administered orally and/or intraperitoneally to three mice (14 to 24 grams) at each of four different doses. The animals are watched for a minimum of 2 hours during which times signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexer, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant activity.

The new and novel compounds (IV) of this invention in the above test procedure when administered orally induce decreased motor activity and decreased respiration at a dosage range of about 40 mg. to about 127 mg./kilo of animal body weight. There are no deaths in the test animals at the highest oral and intraperitoneal dose used, 400 mg./kg.

When the compounds (IV) of this invention are employed as central nervous system depressants they may be administered to mammals, e.g., mice, rats, rabbits, dogs, cats, monkeys, etc. alone or in combination with pharmacologically-acceptable carriers, the proportion of which is determined by the solubility and chemical nature of the compounds, chosen route of administration and standard biological practice. For example, they may be administered orally in the form containing such excipients as starch, milk sugar and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

Liquid phosgene (2.8 ml, 0.039 lmole) is added to ether (100 ml) cooled at 0°C. A solution of 1,2,3,4-tetrahydropyrazino[[1,2-a]indole (5.0 g., 0.029 mole) and triethylamine (3.92 g., 0.039 mole) in dichloromethane (100 ml) is added with stirring at about 5°C. over a period of twenty minutes. The mixture is stirred at about 5°C. for 1½ hours, filtered and the solid washed well with ether. The filtrate and washings are combined and the solvent removed under reduced pressure. The solid residue is dissolved in 2-butanone and admixed with 2-dimethylaminoethylamine (2.56 g, 0.029 mole) and triethylamine (3.92 g, 0.039 mole). The mixture is refluxed for nineteen hours, cooled and filtered. The filtrate is freed of solvent under reduced pressure and the residue recrystallized twice from acetonitrile to give N-(2-dimethylaminoethyl)-1,2,3,4-tetrahydropyrazino[1,2-a]indole-2-carboxamide, (2.29 g, 27.6% yield), m.p. 170°-2°C.

| Analysis for $C_{16}H_{22}N_4O$ | Calculated: | C, 67.10; | H, 7.74; | N, 19.57. |
|---|---|---|---|---|
| | Found: | C, 66.65; | H, 7.55; | N, 19.44. |

In a similar manner, reacting 1,2,3,4-tetrahydro-7-methylpyrazino[1,2-a]indole with 3-diethylaminopropylamine, there is obtained N-(3-diethylaminopropyl)-1,2,3,4-tetrahydro-7-methylpyrazino[1,2-a]indole-2-carboxamide.

EXAMPLE II

Liquid phosgene (2.8 ml, 0.039 mole) is added to ether (100 ml) cooled to 5°C. A solution of 1,2,3,4-tetrahydropyrazino[1,2-a]indole (5.0 g, 0.029 mole) and triethylamine (3.92 g, 0.039 mole) in dichloromethane (100 ml) is added with stirring at about 5°C. over a period of 1¼ hours. The mixture is stirred at about 5°C. for 2 hours, then filtered and the solid washed with ether. The filtrate and washings are combined and freed of solvent under reduced pressure. The residue is dissolved in 2-butanone (250 ml) and mixed with 3-dimethylaminopropylamine (2.97 g, 0.029 mole) and triethylamine (3.92 g, 0.039 mole). The mixture is refluxed for twenty-six hours, filtered and the filtrate freed of solvent under reduced pressure. The residue is recrystallized from acetonitrile to give N-(3-dimethylaminopropyl)-1,2,3,4-tetrahydropyrazino[1,2-a]indole-2-carboxamide (2.24 g), m.p. 164.5°-166°C.

The above-prepared product is coverted to the hy-

| Analysis for $C_{17}H_{24}N_4O$ | Calculated: | C, 67.97; | H, 8.05; | N, 18.65. |
|---|---|---|---|---|
| | Found: | C, 67.18; | H, 7.91; | N, 18.24. | drochloride by adjusting its ethanolic solution to pH 1 with a saturated solution of hydrogen chloride in ethanol. The resulting solution is treated with ether until a solid begins to form. The mixture is chilled, filtered and the solid recrystallized from ethanol-ether to give the hydrochloride, 2.07 g. (21.2% yield), m.p. 196°-198°C.

| Analysis for $C_{17}H_{25}ClN_4O$ | Calculated: | C, 60.65; | H, 7.47; |
|---|---|---|---|
| | | Cl, 10.52; | N, 16.63. |
| | Found: | C, 60.29; | H, 7.76; |
| | | Cl, 10.224; | N, 16.52. |

In like manner, starting with 8,10-diethyl-1,2,3,4-tetrahydropyrazino[1,2-a]indole and 4-dipropylaminobutylamine, there is obtained 8,10-diethyl-1,2,3,4-tetrahydro-N-(4-dipropylaminobutyl)pyrazino[1,2-a]indole-2-carboxamide hydrobromide.

EXAMPLE III

Liquid phosgene (2.8 ml, 0.039 mole) is added to ether (100 ml) cooled to 0°C. A solution of 1,2,3,4-tetrahydropyrazino[1,2-a]indole (5.0 g, 0.029 mole) and triethylamine (3.92 g, 0.039 mole) in dichloromethane (100 ml) is added with stirring at about 5°C. over a period of ¾ of an hour. The mixture is stirred at 0°C. for 1¾ hours, filtered and the solid washed with ether. The filtrate and washings are combined and evaporated to dryness. The residue is dissolved in 2-butanone (250 ml) and admixed with N-phenylpiperazine (4.71 g, 0.029 mole) and triethylamine (3.92 g, 0.039 mole). The mixture is refluxed for twenty seven hours, cooled and filtered. The solid is triturated with water and then dried. This solid is combined with the residue obtained on concentrating the 2-butanone filtrate to dryness. The two solids are recrystallized twice from dichloromethane-heptane to give 1,2,3,4-tetrahydro-2-(4-phenylpiperazinylcarbonyl) pyrazino[1,2-a]indole (5.89 g, 50.3% yield), m.p. 204.5°-206.5°C.

A portion (2.5 g) of the above-prepared product is converted to the hydrochloride by adjusting its solution in dichloromethane to pH 1 with a saturated solution of hydrogen chloride in ethanol. Ether is added until a solid begins to form. The mixture is chilled, filtered and the solid recrystallized from methanol to give 1.55 g. hydrochloride, m.p. 206°–207°C.

| Analysis for C$_{22}$H$_{25}$ClN$_4$O | Calculated: | C, 66.60; | H, 6.35; |
|---|---|---|---|
| | | Cl, 8.94; | N, 14.13. |
| | Found: | C, 66.79; | H, 6.39; |
| | | Cl, 9.16; | N, 14.29. |

In like manner, there is obtained 10-butyl-1,2,3,4-tetrahydro-2-(4-methylpiperazinylcarbonyl)-pyrazino[1,2-a]indole and 7-chloro-1,2,3,4-tetrahydro-2-(4-morphinylcarbonyl) pyrazino[1,2-a]indole.

EXAMPLE IV

Repeating the procedure of prior Examples I–III, a tetrahydropyrazino[1,2-a]indole is reacted with phosgene to afford the corresponding carbonyl chloride which is then contacted with an appropriate amine to yield the following compounds:

N-(2-diethylaminoethyl)-1,2,3,4-tetrahydropyrazino[1,2-a]indole-2-carboxamide;

1,2,3,4-tetrahydro-N-pyrrolidinylethylpyrazino[1,2-a]indole-2-carboxamide;

1,2,3,4-tetrahydro-N-[(1-methyl-4-piperazinyl)ethyl]pyrazino[1,2-a]indole-2-carboxamide;

8-fluoro-1,2,3,4-tetrahydro-N-(2-dimethylaminoethyl)pyrazino[1,2-a]indole-2-carboxamide;

1,2,3,4-tetrahydro-N-(3-dimethylaminopropyl)-8-methoxypyrazino[1,2-a]indole-2-carboxamide;

7-bromo-1,2,3,4-tetrahydro-2-(1-piperidylcarbonyl)pyrazino[1,2-a]indole;

1,2,3,4-tetrahydro-N,N-dimethyl-7-propoxypyrazino[1,2-a]indole-2-carboxamide;

N-ethyl-1,2,3,4-tetrahydropyrazino[1,2-a]indole-2-carboxamide;

1,2,3,4-tetrahydropyrazino[1,2-a]indole-2-carboxamide; and 1,2,3,4-tetrahydro-N-methylpyrazino[1,2-a]indole-2-carboxamide.

EXAMPLE V

Liquid phosgene (2.6 ml, 0.0358 mole) is added to 100 ml ether previously cooled to 0°C. To this mixture, there is added a solution of 2,3,4,5-tetrahydro-1H[1,4]-diazepine[1,2-a]indole (5.00 g, 0.0268 mole) and triethylamine (3.62 g, 0.0358 mole) in dichloromethane (100 ml) at 0°–5°C. over a period of 1 hour. The mixture is stirred at 0°–5°C. for 2 hours after the addition is complete and then filtered. The solid is washed well with ether. The filtrate and washings are combined and freed of solvent. The solid residue is dissolved in 2-butanone (250 ml). 4-Amino-1-methylpiperidine (3.05 g, 0.0268 mole) and triethylamine (3.62 g, 0.0358 mole) are added and the mixture stirred at reflux for twenty-six hours. After cooling, the mixture is filtered, the filtrate freed of solvent and the residue recrystallized twice from acetonitrile and once from ethanol to give 2.10 g. of 4,5-dihydro-H-(1-

| Analysis Calcd for C$_{19}$H$_{26}$N$_4$: | C, 69.90; | H, 8.03; | N, 17.17. |
|---|---|---|---|
| | | Found: C, 69.77; | H, 7.90; N, 17.29. | methyl-4-piperidyl)-1H[1,4]-diazepino[1,2-a]indole-2-(3H)-carboxamide (24.0% yield), m.p. 212°–4°C.

When evaluated in the foregoing pharmacological procedure the latter compound produced decreased motor activity in a host at a dose of 40 MPK administered intraperitoneally and decreased respiration at a dose of 127 MPK administered intraperitoneally.

In a similar manner, 4,5-dihydro-8-iodo-11-methyl-N-(1-ethyl-4-piperidyl)-1H[1,4]-diazepino[1,2-a]indole-2-(3H)-carboxamide and 9-ethoxy-4,5-dihydro-N-(1-propyl-4-piperidyl)-1H[1,4]-diazepino[1,2-a]indole-2-(3H)-carboxamide are prepared.

EXAMPLE VI

Repeating the procedure of Example V substituting morpholinoethylamine (3.12 g, 0.0268 mole) for 4-amino-1-methylpiperidine, there is afforded the corresponding product. Two recrystallizations from acetonitrile gives 4.15 g. (45.2% yield) of 4,5-dihydro-N-(2-

| Analysis Calcd for C$_{19}$H$_{26}$N$_4$O$_2$: | C, 66.64; | H, 7.75; N, 16.36. |
|---|---|---|
| | Found: C, 66.62; | H, 7.35; N, 16.65. | morpholinoethyl)-1H[1,4]-diazepino [1,2-a]indole-2-(3H)-carboxamide, m.p. 140.5°–142°C.

When evaluated in the foregoing pharmacological procedure the latter compound produced decreased motor activity and decreased respiration in a host at a dose of 127 MPK administered intraperitoneally.

A sample of the above-prepared compound is converted to the hydrochloride by treating its ethanolic solution with saturated ethanolic hydrogen chloride. The

| Analysis Calcd for C$_{19}$H$_{27}$ClN$_4$O$_2$·H$_2$O: | C, 57.52; | H, 7.37; |
|---|---|---|
| | Cl, 8.94; | N, 14.12. |
| Found: | C, 57.72; | H, 7.00; |
| | Cl, 9.12; | N, 14.26. | salt precipitates alcohol to give the hydrochloride monohydrate, m.p. 186°–188°C.

In the same manner, the following compounds are obtained:

8-fluoro-11-hexyl-4,5-dihydro-N-(4-morpholinobutyl)-1H[1,4]-diazepino[1,2-a]indole-2-(3H)-carboxamide;

N-[3-(1-ethyl-4-piperazinyl)propyl]-4,5-dihydro-1H[1,4]-diazepino[1,2-a]indole-2-(3H)-carboxamide;

N-[2-(1-methyl-4-piperazinyl)ethyl]-4,5-dihydro-11-propyl-1H[1,4]-diazepino[1,2-a]indole-2-(3H)-carboxamide; and 8-butyl-4,5-dihydro-N-(3-pyrrolidinylpropyl)-1H[1,4]-diazepino[1,2-a]indole-2-(3H)-carboxamide.

EXAMPLE VII 4,5-Dihydro-N-(1-phenyl-4-piperazinylcarbonyl)-1H[1,4]-diazepino[1,2-a]indole is prepared in the same manner as Example V except that N-phenylpiperazine (4.35 g, 0.0268 mole) is used instead of 4-amino-1-methylpiperidine. Two recrystallizations from acetonitrile gives 5.21 g. (51.9% yield) of product, m.p. 178°–181°C.

A sample of the above-prepared compound is converted to the hydrochloride by treating its ethanolic suspension with saturated ethanolic hydrogen chloride. The salt precipitates on addition of ether and is recrystallized from ethanol, m.p. 203°–205°C. (dec.).

| Analysis Calc'd for $C_{23}H_{26}N_4O$: | C, 73.77; | 7.00; | N, 14.96. |
| | Found: C, 73.51; | H, 6.99; | N, 14.96. |

| Analysis Calc'd for $C_{23}H_{27}ClN_4O$: | C, 67.21; | H, 6.62; |
| | Cl, 8.63; | N, 13.62. |
| | Found: C, 66.94; | H, 6.89; |
| | Cl, 8.47; | N, 13.39. |

Similarly, the following compounds are prepared:
8-benzyloxy-4,5-dihydro-N-thiomorphino-1H[1,4]-diazepino[1,2-a]indole-2-(3H)-carboxamide;
9-butyl-4,5-dihydro-N-pyrrolidinylcarbonyl-1H[1,4]-diazepino[1,2-a]indole;
4,5-dihydro-N-imidazolidinyl-1H[1,4]-diazepino[1,2-a]indole-2-(3H)-carboxamide;
N,N-diethyl-4,5-dihydro-11-methyl-1H[1,4]-diazepino[1,2-a]indol-2-(3H)-carboxamide;
4,5-dihydro-N-propyl-1H[1,4]-diazepino[1,2-a]indol-2-(3H)-carboxamide; and
4,5-dihydro-N-phenyl-1H[1,4]-diazepino[1,2-a]indol-2-(3H)-carboxamide.

What is claimed is:

1. A compound selected from the group consisting of those having the formula:

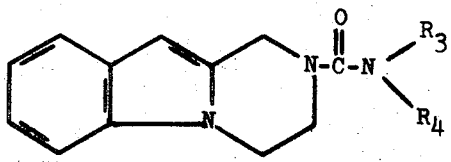

wherein $R_3$ and $R_4$ when taken separately are selected from the group consisting of hydrogen, di(lower)alkylamino(lower)alkyl in which each of the lower alkyl moieties has from one to three carbons; $R_3$ and $R_4$ when taken together with the nitrogen atom to which they are attached form phenylpiperazinyl.

2. N-(2-dimethylaminoethyl)-1,2,3,4-tetrahydropyrazino[1,2-a]indole-2-carboxamide.

3. N-(3-dimethylaminopropyl)-1,2,3,4-tetrahydropyrazino[1,2-a]indole-2-carboxamide.

4. 1,2,3,4-Tetrahydro-2-(4-phenyl-1-piperazinylcarbonyl)pyrazino[1,2-a]indole.

* * * * *